US012319179B2

(12) United States Patent
Okui

(10) Patent No.: US 12,319,179 B2
(45) Date of Patent: Jun. 3, 2025

(54) SEAT AND SEAT PRODUCTION METHOD

(71) Applicant: DELTA KOGYO CO., LTD., Hiroshima (JP)

(72) Inventor: Takahiro Okui, Hiroshima (JP)

(73) Assignee: DELTA KOGYO CO., LTD., Hiroshima (JP)

( * ) Notice: Subject to any disclaimer, the term of this patent is extended or adjusted under 35 U.S.C. 154(b) by 0 days.

(21) Appl. No.: 17/754,835

(22) PCT Filed: Sep. 17, 2020

(86) PCT No.: PCT/JP2020/035344
§ 371 (c)(1),
(2) Date: Apr. 13, 2022

(87) PCT Pub. No.: WO2021/090588
PCT Pub. Date: May 14, 2021

(65) Prior Publication Data
US 2024/0227645 A1    Jul. 11, 2024

(30) Foreign Application Priority Data
Nov. 6, 2019    (JP) .................................. 2019-201681

(51) Int. Cl.
*B60N 2/58*    (2006.01)
*B60N 2/64*    (2006.01)

(52) U.S. Cl.
CPC ............. *B60N 2/5883* (2013.01); *B60N 2/64* (2013.01)

(58) Field of Classification Search
CPC ................................ B60N 2/5883; B60N 2/64
See application file for complete search history.

(56) References Cited

U.S. PATENT DOCUMENTS 3,632,164 A * 1/1972 Radke .................. B60N 2/5825
297/452.6
3,794,378 A  2/1974 Haslam et al.
(Continued)

FOREIGN PATENT DOCUMENTS

CN    106998923 A    8/2017
CN    107074134 A    8/2017
(Continued)

OTHER PUBLICATIONS

The extended European search report issued by the European Patent Office on Sep. 21, 2022, which corresponds to European Patent Application No. 20884649.3-1012 and is related to U.S. Appl. No. 17/754,835.

(Continued)

*Primary Examiner* — Anthony D Barfield
(74) *Attorney, Agent, or Firm* — Studebaker Brackett PLLC

(57) ABSTRACT

A seat of the present invention can prevent wrinkles of a cover at a curved part of an inward-suspending portion and improve attaching workability of inward-suspending member while keeping manufacturing cost low. An inward-suspending portion of a cover has a linear part and a curved part continuous with each other. An inward-suspending member has a rigid part attached to one edge of a main body. The main body of the inward-suspending member is superposed on the inward-suspending portion of the cover in a state where the rigid part of the inward-suspending member is spaced by a predetermined distance outwards from the end edge extending in the longitudinal direction of the inward-suspending portion and a part of the second edge on the upper side of the main body is overlapped to the cover. At a sewing portion, the main body is sewn continuously to the (Continued)

inward-suspending portion, from a linear part to a curved part.

1 Claim, 15 Drawing Sheets

(56) References Cited

U.S. PATENT DOCUMENTS

| | | | | |
|---|---|---|---|---|
| 6,899,399 | B2 * | 5/2005 | Ali | B60N 2/5825 5/403 |
| 6,964,453 | B1 * | 11/2005 | Flegal | B60N 2/5825 297/452.61 |
| 7,506,939 | B2 * | 3/2009 | Brockschneider | B60N 2/5825 297/452.6 |
| 2013/0249269 | A1 | 9/2013 | Sasaki et al. | |
| 2017/0225595 | A1 | 8/2017 | Ikawa et al. | |
| 2017/0327021 | A1 | 11/2017 | Okui et al. | |
| 2018/0345836 | A1 | 12/2018 | Baba et al. | |
| 2019/0054845 | A1 | 2/2019 | Ikawa et al. | |

FOREIGN PATENT DOCUMENTS

| | | |
|---|---|---|
| CN | 108290506 A | 7/2018 |
| DE | 201 00 848 U1 | 3/2001 |
| JP | H06-045600 U | 6/1994 |
| JP | 2007-275557 A | 10/2007 |
| JP | 2009-148350 A | 7/2009 |
| JP | 2013-199252 A | 10/2013 |
| JP | 2018-126435 A | 8/2018 |
| WO | 02/054917 A2 | 7/2002 |

OTHER PUBLICATIONS

An Office Action mailed by China National Intellectual Property Administration on Jan. 26, 2024, which corresponds to Chinese Patent Application No. 202080071293.6 and is related to U.S. Appl. No. 17/754,835 with English language translation.
International Search Report issued in PCT/JP2020/035344; mailed Dec. 8, 2020.

* cited by examiner

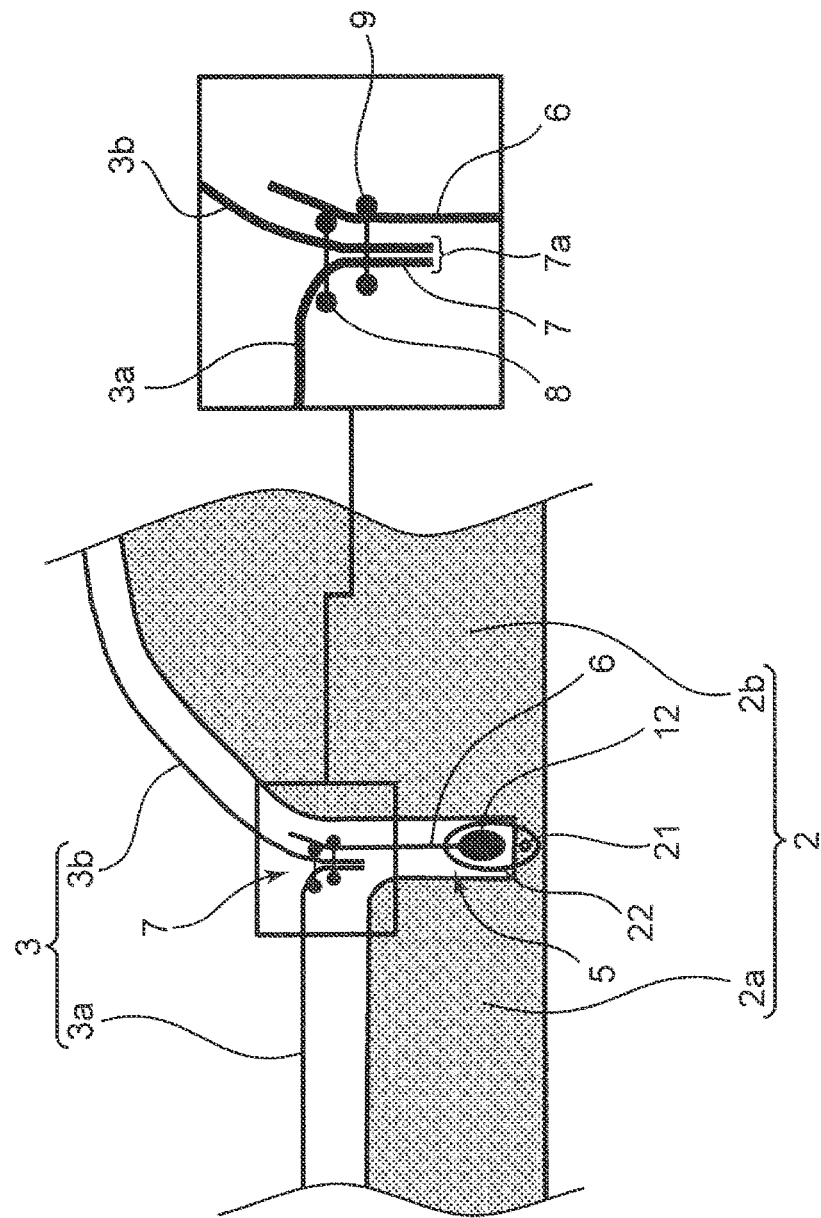

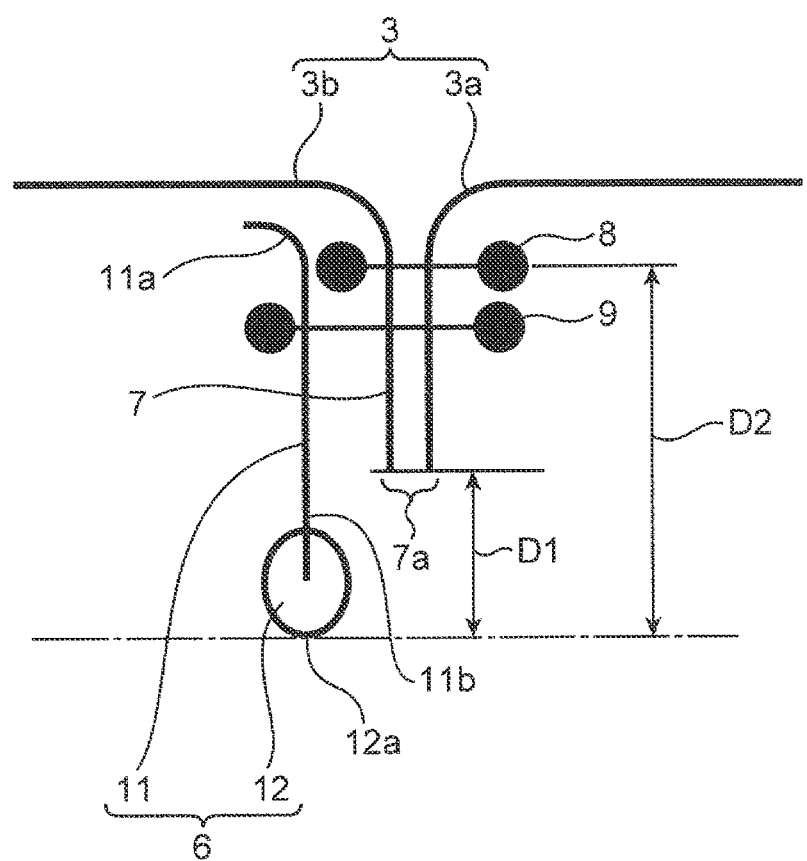

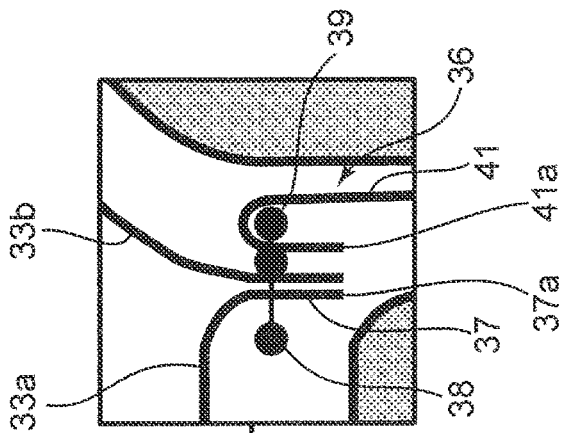
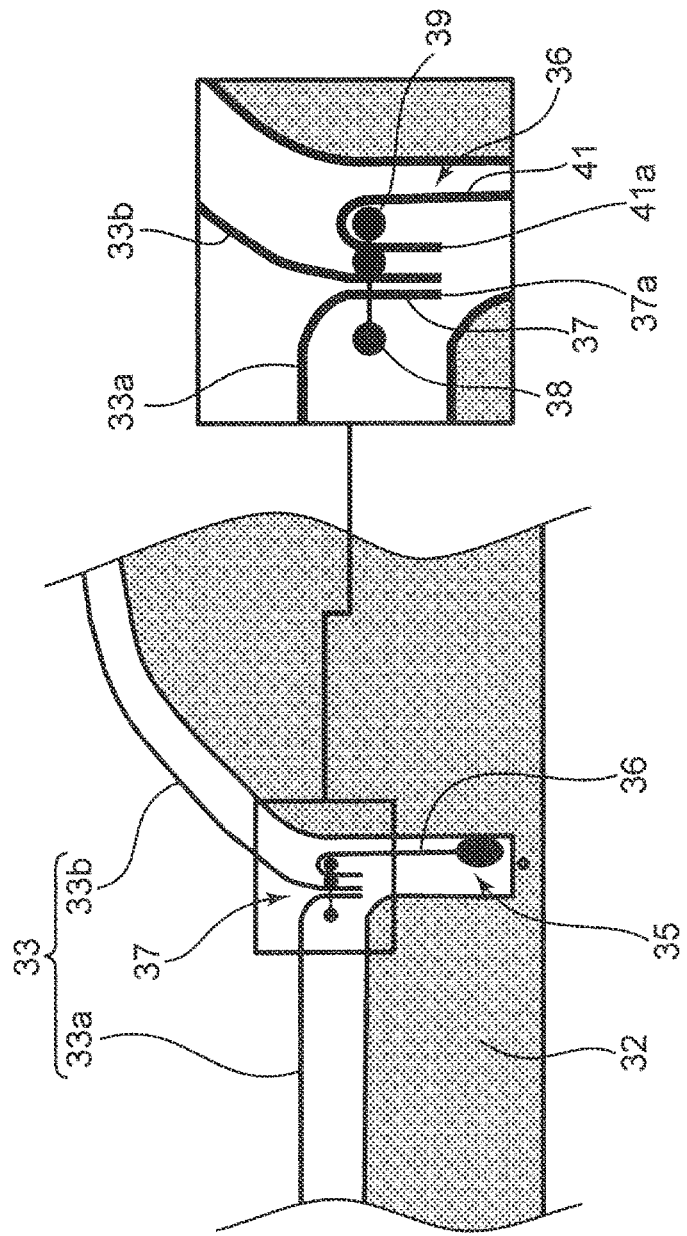

SEAT AND SEAT PRODUCTION METHOD

TECHNICAL FIELD

The present invention relates to a seat in which an inward-suspending portion of a cover has a curved part and to a manufacturing method for the seat.

BACKGROUND ART

A seat used for an automobile or the like usually has a structure in which a surface of a pad is covered with a cover, as shown in the structure of a seat described in Patent Literature 1. The cover has an inward-suspending portion that is pulled into a groove of the pad and suspended therein. The inward-suspending portion has a continuous strip shape as a whole, and has a curved part, extending in a curved shape, formed on a specific part of the seat. The inward-suspending portion is pulled into the groove formed on the surface of the pad by an inward-suspending member and is suspended in the groove, where the inward-suspending portion is fixed to a locking member, such as a wire, inside the pad, using fasteners, such as hog rings.

The inward-suspending member includes a main body extending in a strip shape, and a rigid part having flexural rigidity and attached to one edge of the main body, the one edge extending in a longitudinal direction.

The Patent Literature 1 adopts a structure where the main body and the inward-suspending portion are sewn together in a state in which the other edge of the main body of the inward-suspending member, the other edge extending in the longitudinal direction, is aligned with an end edge of the inward-suspending portion of the cover (see, for example, a schematic diagram of FIG. 14. In FIG. 14, the reference numeral 36 denotes the inward-suspending member, 37 denotes the inward-suspending portion, 41 denotes the main body (41a denotes the other edge), and 42 denotes the rigid part).

In this structure, in a state in which the main body of the inward-suspending member and the inward-suspending portion of the cover are sewn together, the main body of the inward-suspending member is folded back at its sewn part to separate the rigid part downward away from the inward-suspending portion of the cover and have the rigid part fixed to a fixing portion, such as a wire, inside the pad.

The structure described in Patent Literature 1 includes the structure in which the main body and the inward-suspending portion are sewn together in the state in which the other edge of the main body of the inward-suspending member, the other edge extending in the longitudinal direction, is aligned with the end edge of the inward-suspending portion of the cover. In this structure, folding back the main body of the inward-suspending member at its sewn part to separate the rigid part away from the inward-suspending portion of the cover (see FIG. 14) creates, at the curved part of the inward-suspending portion of the cover, a state in which the peripheral length of the rigid part attached to the one edge of the main body of the inward-suspending member does not match the peripheral length of the end edge of the inward-suspending portion of the cover. A difference between these peripheral lengths may result in wrinkling of the cover.

In a case where, to prevent wrinkling, only the curved part of the inward-suspending portion is provided with a separate part (such as a cloth with a low elongation percentage), the manufacturing cost of the seat increases and improving the workability of inward-suspending member attachment work becomes difficult.

CITATION LIST

Patent Literature

Patent Literature 1: JP 2018-126435 A

SUMMARY OF INVENTION

An object of the present invention is to provide a seat that can prevent wrinkling of a cover at a curved part of an inward-suspending portion and that can improve the workability of inward-suspending member attachment work while keeping manufacturing cost low, and to provide a manufacturing method for the seat.

Means for Solving the Problems

In order to solve the above problems, a seat of the present invention includes: a pad; a cover that covers a surface of the pad, the cover having an inward-suspending portion projecting in a direction approaching to the pad from a side opposite to the pad; and an inward-suspending member that fixes the inward-suspending portion to the pad. The inward-suspending portion includes a linear part and a curved part continuous with each other. The inward-suspending member includes a main body of a strip shape, the main body having a first edge and a second edge that extend in a longitudinal direction, and a rigid part of a linear shape, the rigid part having flexural rigidity higher than that of the main body and attached to the first edge of the main body. The main body of the inward-suspending member is superposed on the inward-suspending portion of the cover in a state in which the rigid part at a position outside the inward-suspending portion and separated away from an end edge of the inward-suspending portion, the end edge extending in a longitudinal direction, extends along and parallel with the end edge as the second edge of the main body overlaps the cover. The main body is sewn continuously to the inward-suspending portion, from the linear part to the curved part. The inward-suspending portion is fixed to the pad in a state in which the main body of the inward-suspending member extends along the inward-suspending portion without being folded back.

A manufacturing method for a seat according to the present invention is a manufacturing method for a seat including: a pad; a cover that covers a surface of the pad, the cover having an inward-suspending portion projecting in a direction approaching to the pad from a side opposite to the pad; and an inward-suspending member that fixes the inward-suspending portion to the pad, the inward-suspending portion including a linear part and a curved part continuous with each other, and the inward-suspending member including a main body of a strip shape, the main body having a first edge and a second edge that extend in a longitudinal direction, and a rigid part of a linear shape, the rigid part having flexural rigidity higher than that of the main body and attached to the first edge of the main body. The manufacturing method includes: a sewing step of sewing the main body continuously to the inward-suspending portion, from the linear part to the curved part while maintaining a state in which the rigid part outside the inward-suspending portion is separated away from an end edge of the inward-suspending portion, the end edge extending in a longitudinal direction, by a given distance, and causing the second edge of the main body to overlap the cover; and a cover attaching step of fixing the inward-suspending portion to the pad as the main body of the inward-suspending member extends along the inward-suspending portion without being folded back, thereby attaching the cover to the pad.

BRIEF DESCRIPTION OF DRAWINGS

FIG. 2A is an explanatory cross-sectional view showing a state in which an inward-suspending portion of a cover of FIG. 1 is fixed to a pad by an inward-suspending member, and FIG. 2B is an enlarged cross-sectional view at the vicinity of the inward-suspending portion of FIG. 2A;

FIG. 5 is an explanatory perspective view showing a state in which the inward-suspending member of FIGS. 3A and 3B is fixed to the inward-suspending portion of FIGS. 2A and 2B;

FIG. 10 is an explanatory cross-sectional view showing a dimensional relationship in the cross-sectional view of FIG. 9;

FIG. 11A is a cross-sectional view of a comparative example, showing a state in which an inward-suspending portion of a cover of a conventional seat is fixed to a pad by an inward-suspending member, and FIG. 11B is an enlarged cross-sectional view at the vicinity of the inward-suspending portion of FIG. 11A;

DESCRIPTION OF EMBODIMENTS

A preferred embodiment of the present invention will hereinafter be described with reference to the drawings.

Figure 1:
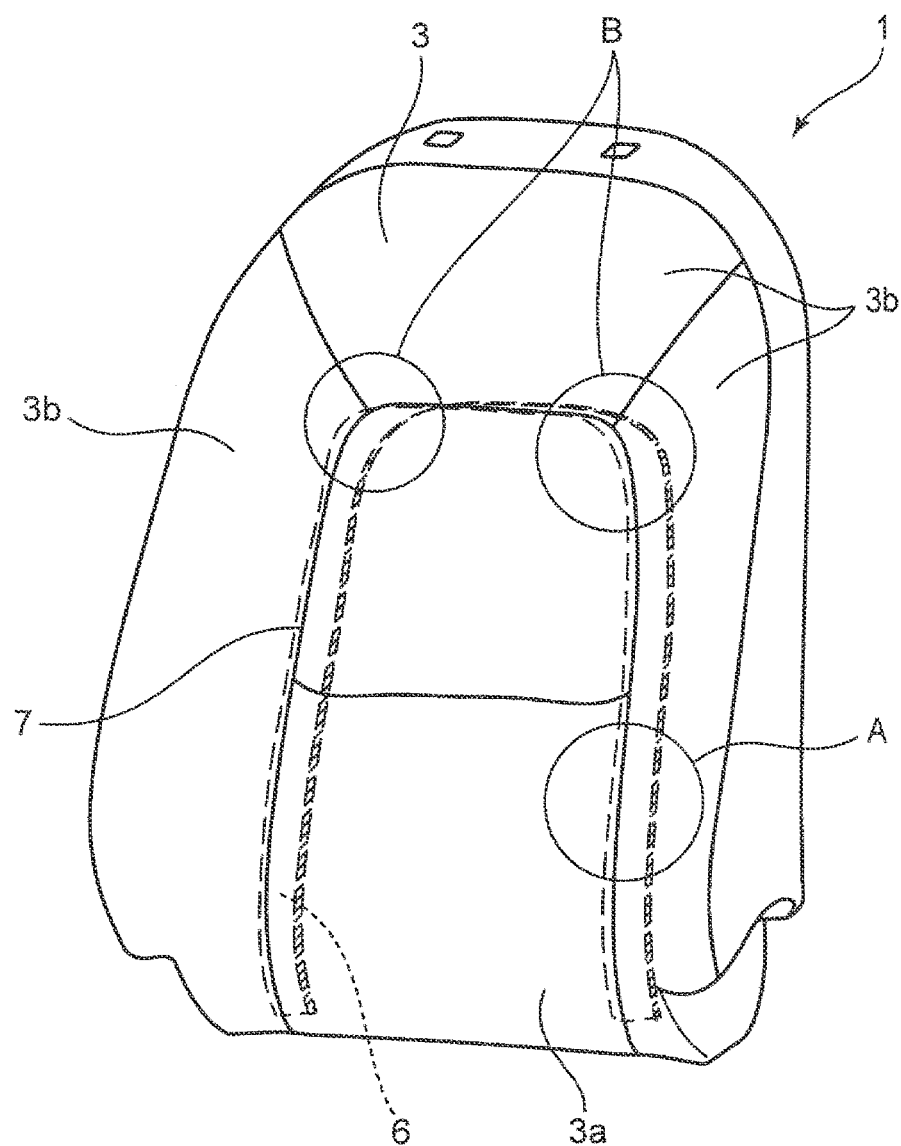
FIG. 1 is a perspective view schematically showing a seat back of a seat for automobiles according to an embodiment of a seat of the present invention.

As shown in FIG. 1, a seat 1 for automobiles, which is an embodiment of a seat of the present invention, includes a seat back that supports the back of a seated person. As shown in FIGS. 1 and 2, the seat back includes a pad 2, a cover 3 covering the surface of the pad 2, and an inward-suspending member 6.

The pad 2 is a soft member made from a foamed resin, such as urethane. The pad 2 has a flat surface part 2a and a curved surface part 2b. The flat surface part 2a is a part that supports the back of the seated person on the seat 1. The curved surface part 2b is a part bulging out continuously around the flat surface part 2a (right side in FIGS. 2A and 2B).

Between the flat surface part 2a and the curved surface part 2b of the pad 2, a groove 5 is formed continuously as a recess in which an inward-suspending portion 7 of the cover 3 is fixed.

The cover 3 is a member made of a single layer of a sheet material, such as natural leather, synthetic leather, or fabric (fabric product, textile, etc.) or two or more layers of a sheet material, consisting of the aforementioned sheet material such as leather and nonwoven fabric or foamed resin. Specifically, as shown in FIGS. 2A and 2B, the cover 3 has a plurality of cover parts 3a and 3b that have shapes corresponding respectively to the surface shapes of the flat surface part 2a and the curved surface part 2b so as to cover the surfaces of the flat surface part 2a and the curved surface part 2b of the pad 2 without a gap.

The cover 3 is formed by joining together respective ends of the cover parts 3a and 3b adjacent to each other by sewing or the like (see a sewing portion 8 in FIG. 2B). A portion where the ends of the adjacent cover parts 3a and 3b are joined together by the sewing portion 8 is formed as the inward-suspending portion 7. In other words, the cover 3 has the inward-suspending portion 7 that projects from a side opposite to the pad 2 (lower side in FIGS. 2A and 2B) toward the pad 2 and that is pulled into the groove 5 and fixed to the pad 2.

The inward-suspending portion 7 has a continuous strip shape as a whole, and has linear parts (e.g., parts each extending vertically in a range A of FIG. 1) and curved parts (e.g., two parts each curved in a substantially L shape in a range B of FIG. 1) that are continuous with each other. The overall shape of the inward-suspending portion 7 shown in FIG. 1 is, therefore, a strip shape bent into an inverted U shape.

The groove 5 of the pad 2 also has an inverted U shape in a manner that the groove 5 corresponds to overall shape to the inward-suspending portion 7 (i.e., a shape having a pair of linear parts and of curved parts).

The inward-suspending member 6 is configured to be capable of pulling in the inward-suspending portion 7 toward the pad 2, thereby fixing the inward-suspending portion 7 to the pad 2.

Figure 3A:
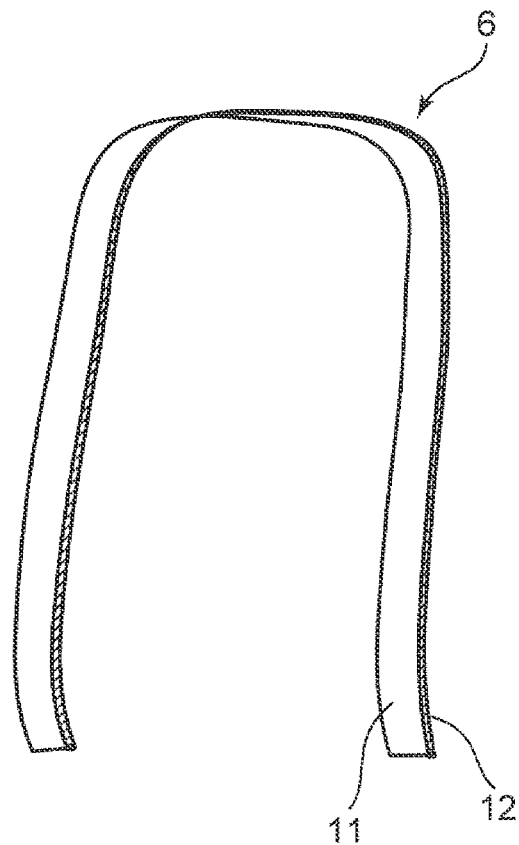
FIG. 3A is an overall perspective view of the inward-suspending member of FIG. 1.
Figure 3B:
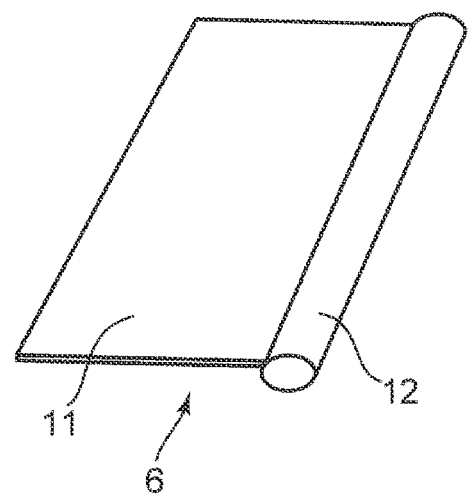
FIG. 3B is an enlarged view of an end of the inward-suspending member of FIG. 3A.
Figure 9:
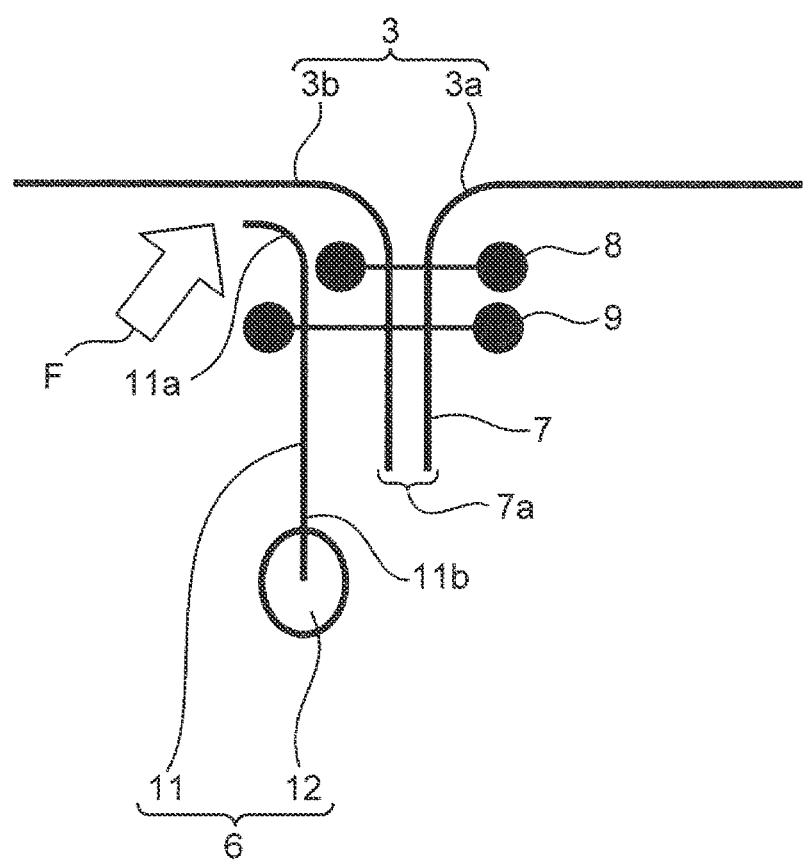
FIG. 9 is a cross-sectional view taken along a line IX-IX of FIG. 8.
Figure 12:
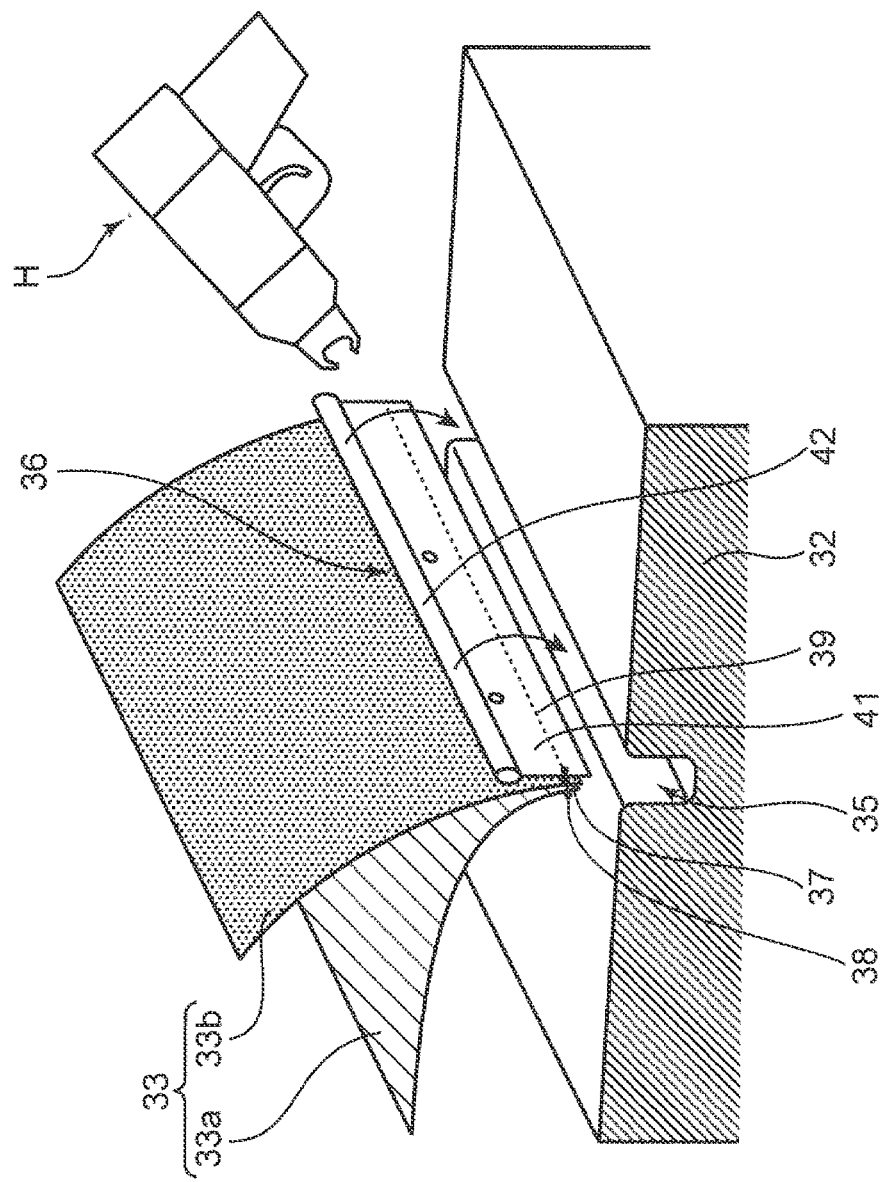
FIG. 12 is a perspective view of a comparative examples, showing a state in which the inward-suspending portion of the cover of the conventional seat is fixed in a groove of the pad via the inward-suspending member.

Specifically, as shown in FIGS. 3A and 3B, the inward-suspending member 6 includes a main body 11 of a strip shape, and a rigid part 12 of a linear shape that is attached to one edge of main body 11, the one edge extending in a longitudinal direction (that is, a first edge 11b extending in the longitudinal direction on the lower side in FIGS. 9 and 10).

The rigid part 12 in its initial state before the inward-suspending member 6 is attached to the inward-suspending portion 7 has a linear shape as shown in FIG. 3B, or a shape extending with a curve gentler than the curved part of the inward-suspending portion 7 (the curved part in the range B of FIG. 1). The flexural rigidity of the rigid part 12 is set higher than that of the main body 11.

The main body 11 and the rigid part 12 may be made of any chosen material, providing that the above conditions are met. Therefore, for example, the main body 11 of a strip shape and the rigid part 12 of a cylindrical shape may be formed integrally of a synthetic resin or the like. In this case, when considering a bending force applied to each of the main body 11 and the rigid part 12 in a direction perpendicular to the longitudinal direction (a bending force applied vertically in FIG. 3B), the second moment of area of the rigid part 12 of the cylindrical shape increases to become larger than the second moment of area of the main body 11 of the strip shape, so that the flexural rigidity corresponding to the second moment of area also increases.

In another case, the main body 11 may be molded from a resin, and the rigid part 12 may be made from a metal wire rod or the like and fixed to the first edge 11b of the main body 11 by heat welding, bonding, or the like.

The main body 11 of the inward-suspending member 6 shown in FIGS. 3A and 3B is superposed on the inward-suspending portion 7 of the cover 3 in a state where the rigid part 12 extends in parallel with the end edge 7a at the position spaced outwards from the end edge 7a extending in the longitudinal direction of the inward-suspending portion 7 (see FIGS. 2B and 4), (specifically, the rigid part 12 at a position separated away from the end edge 7a in the direction of projection of the inward-suspending portion 7 (that is, the direction perpendicular to the longitudinal direction of the inward-suspending portion 7)) and a part of the second edge 11a on the upper side of the main body 11 (see FIGS. 9 and 10) (i.e., the edge on the upper side opposite to the first edge 11b on the lower side to which the rigid part 12 is attached) overlaps the cover 3.

Figure 4:
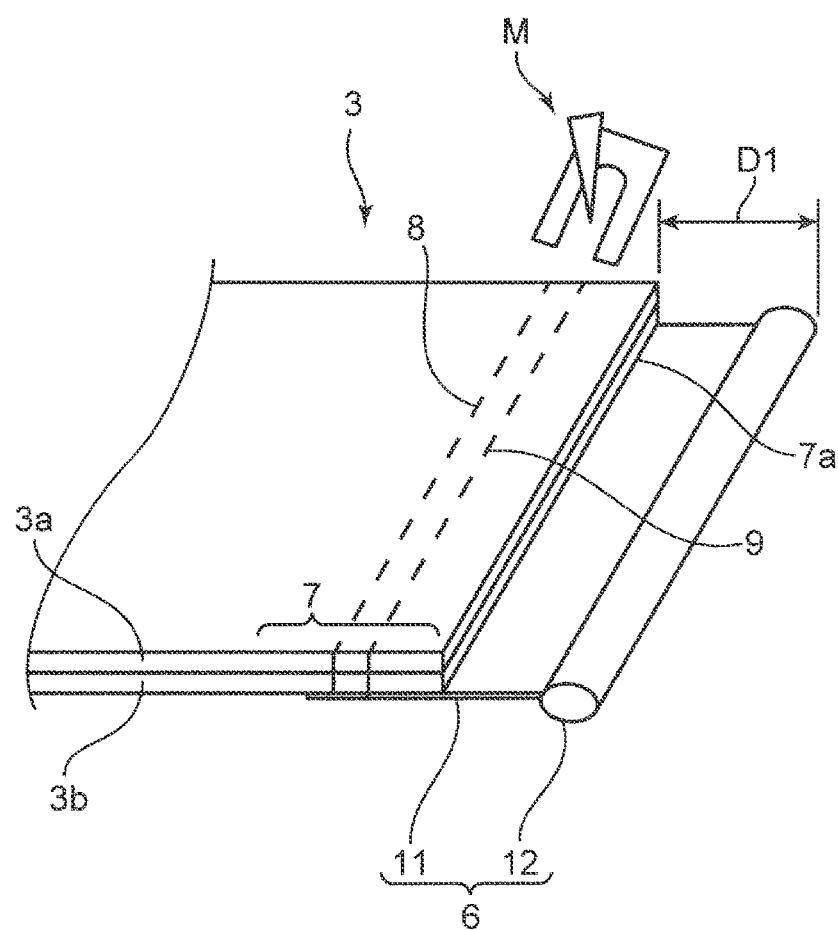
FIG. 4 is an explanatory perspective view showing a sewing step according to an embodiment of a manufacturing method for the seat of the present invention, the sewing step being a step of sewing a main body of the inward-suspending member to the inward-suspending portion of the cover.

As shown in FIGS. 2B and 4, the main body 11 of the inward-suspending member 6 is sewn continuously to the inward-suspending portion 7, from the linear part (range A in FIG. 1) to the curved part (range B in FIG. 1) of the inward-suspending portion 7 of the cover 3, thus forming a sewing portion 9.

The inward-suspending portion 7, as described above, is formed by sewing together two adjacent cover parts 3a and 3b making up the cover 3.

The sewing portion 9, where the main body 11 of the inward-suspending member 6 is sewn to the inward-suspending portion 7, is located at a position (lower side in FIGS. 2A, 2B, 9, and 10) closer to the end edge 7a extending in the longitudinal direction of the inward-suspending portion 7 (FIGS. 4 and 10), than the sewing portion 8, where the two cover parts 3a and 3b of the inward-suspending portion 7 are sewn together.

As shown in FIGS. 9 and 10, the second edge 11a on the upper side of the main body 11 of the inward-suspending member 6 is in contact with a surface of cover 3 that is opposite to the pad 2 (specifically, in contact with the cover part 3b via the sewing portion 8). It should be noted that in FIGS. 9 and 10, the second edge 11a, the cover part 3b, and the sewing portion 8 are illustrated as elements separated from each other, in order to show them more clearly. These elements, however, are actually in close contact with each other.

The inward-suspending portion 7 is fixed to the pad 2 in a state in which the main body 11 of the inward-suspending member 6 extends along the inward-suspending portion 7 without being folded back. The "state in which the main body 11 extends along the inward-suspending portion 7 without being folded back" refers to the state where the main body 11 extends along the inward-suspending portion 7 so that the second edge 11a on the upper side of the main body 11 does not overlap a different part of the main body 11.

(Manufacturing Method for Seat 1)

The above-described seat 1 is manufactured in the following manner.

First, respective ends of the plurality of cover parts 3a and 3b making up the cover 3 are sewn together to form the sewing portion 8, using a sewing machine M or the like shown in FIG. 4. As a result, the inward-suspending portion 7 projecting toward the pad 2 is formed on the cover 3 (inward-suspending portion forming step).

Subsequently, the main body 11 of the inward-suspending member 6 is sewn to the inward-suspending portion 7 of the cover 3 (sewing step). As the inward-suspending member 6, a member with the main body 11 of a shape extending linearly with a constant width is used.

Specifically, as shown FIGS. 9 and 10, the step of sewing the inward-suspending member 6 is carried out such that the main body 11 is sewn continuously to the inward-suspending portion 7, from the linear part to the curved part while maintaining a state where the rigid part 12 of the inward-suspending member 6 is spaced by a predetermined distance outwards from the end edge 7a extending in the longitudinal direction of the inward-suspending portion 7 (e.g., by a distance D1 from the end edge 7a to a lower end (far side end) 12a of the rigid part 12, the distance D1 being shown in FIGS. 4 and 10) and a part of the second edge 11a on the upper side of the main body 11 is overlapped to the cover 3 (specifically, overlap the cover part 3b).

In this sewing step, it is preferable that the main body 11 of the inward-suspending member 6 be sewn to the inward-suspending portion 7 while holding the rigid part 12 such that the rigid part 12 is kept separated outside the inward-suspending portion 7 and away from the end edge 7a extending in the longitudinal direction of the inward-suspending portion by a given distance, using a sewing jig.

The present invention does not place any particular limitation on the shape of the sewing jig. The sewing jig is applicable as long as it is capable of maintaining the rigid part 12 spaced by a predetermined distance outwards from the end edge 7a of the inward-suspending portion 7 during work of sewing the main body 11 continuously to the inward-suspending portion 7, from the linear part to the curved part (specifically, during the linear movement of the inward-suspending portion 7 and inward-suspending member 6 that are fed out simultaneously by sewing work using the sewing machine M of FIG. 4).

By this sewing step, one inward-suspending member 6 can be sewn continuously to the linear part (range A in FIG. 1, and FIG. 5) and the curved part (range B in FIG. 1, and FIGS. 6 and 7) of the inward-suspending portion 7 of the cover 3. Having been sewn to the inward-suspending portion 7, the inward-suspending member 6, which has a linearly extending shape in its initial state, changes into an inverted U shape shown in FIG. 3A so as to match the shape of the inward-suspending portion 7 (i.e., an inverted U shape shown in FIG. 1).

Figure 5:
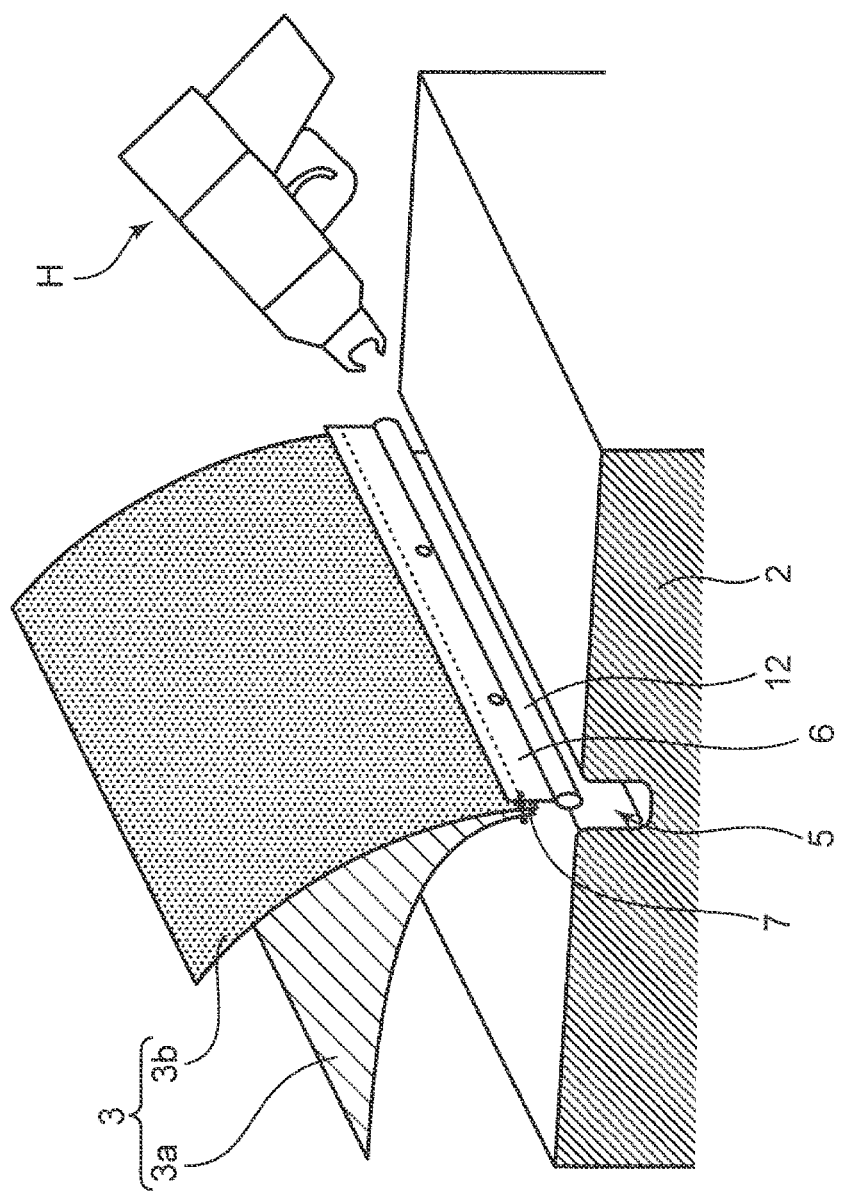
FIG. 5 is an explanatory perspective view showing a cover attaching step of fixing the inward-suspending portion of the cover into a groove of the pad via the inward-suspending member, following completion of the sewing step of FIG. 4
Figure 6:
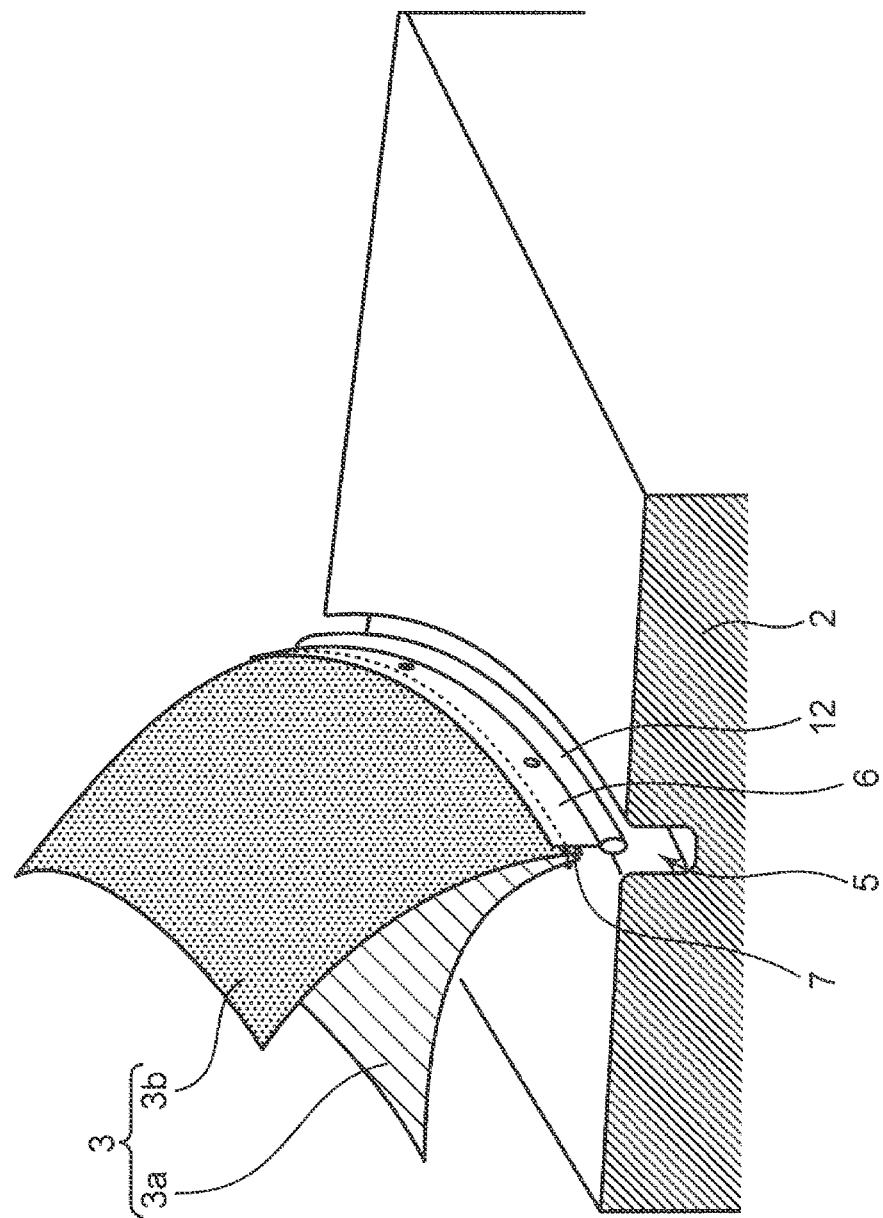
FIG. 6 is an explanatory perspective view showing a step of fixing a curved part of the inward-suspending portion and the inward-suspending member, the inward-suspending portion and the inward-suspending member being shown in FIG. 5, in the groove of the pad.
Figure 7:
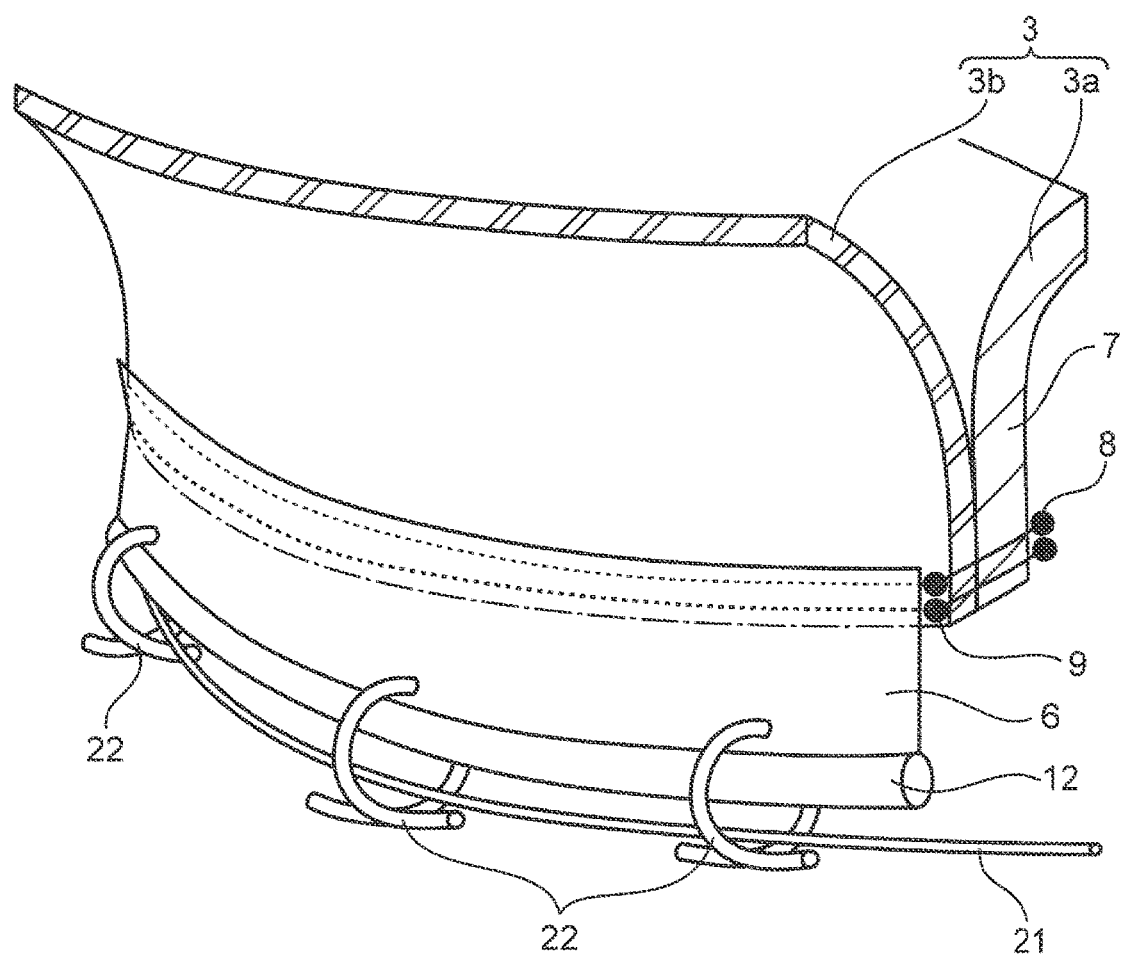
FIG. 7 is an explanatory perspective view showing a step of fixing a rigid part of the inward-suspending member of FIG. 6 to a fixing wire rod extending inside the groove of the pad, using fasteners, such as hog rings.

Following the sewing step, as shown in FIGS. 5 to 7, the inward-suspending member 6 sewn to the inward-suspending portion 7 of the cover 3 is inserted into the linear part and the curved part of the groove 5 of the pad 2. Then, as shown in FIG. 7, the rigid part 12 on the lower end of the inward-suspending member 6 is fixed to a fixing wire rod 21, such as a wire, inside the groove 5, using fasteners 22, such as one-turn coils or ring-shaped clips. In this operation, a tool, such as a hog ringer H shown in FIG. 5, is used for carrying out fastening with the fasteners 22, such as hog rings. By this fixing operation, the inward-suspending portion 7 of the cover 3 is fixed in the groove 5 of the pad 2 via the inward-suspending member 6. Hence the cover 3 can be attached to the surface of the pad 2 in a state in which the inward-suspending portion 7 is fixed to the pad 2 over the entire length (or the required length) of the inward-suspending portion 7 (cover attaching step). This completes manufacturing of the seat 1.

In recent years, there is a tendency that the groove 5 of the pad 2 becomes shallower, which requires reduction of the width of main body 11 of the inward-suspending member 6. In the above configuration of the seat 1, however, the inward-suspending member 6 is sewn in the state where the inward-suspending member 6 is abutted against the inward-suspending portion 7 of the cover 3 (that is, in the state where the rigid part 12 spaced outwards from the inward-suspending portion 7 in advance from the end edge 7a of the inward-suspending portion 7 by a predetermined distance). This makes it easy to visually recognize the main body 11 and the rigid part 12 from outside, thus facilitating work of fixing the rigid part 12 to the fixing wire rod 21 inside the groove 5 of the pad 2, using the fasteners 22.

(Features of Present Embodiment)

(1) In the seat 1 of the present embodiment, as shown in FIGS. 2A and 2B, the main body 11 of the inward-suspending member 6 is superposed on the inward-suspending portion 7 of the cover 3 in the state where the rigid part 12 extends along and in parallel with the end edge 7a at the position spaced outwards from the end edge 7a extending in the longitudinal direction of the inward-suspending portion 7, while the second edge 11a on the upper side of the main body 11 overlaps the cover 3. In addition, the main body 11 is sewn continuously to the inward-suspending portion 7, from the linear part to the curved part of the inward-suspending portion 7. The inward-suspending portion 7 is fixed to the pad 2 in the state where the main body 11 of the inward-suspending member 6 extends along the inward-suspending portion 7 without being folded back.

Figure 8:
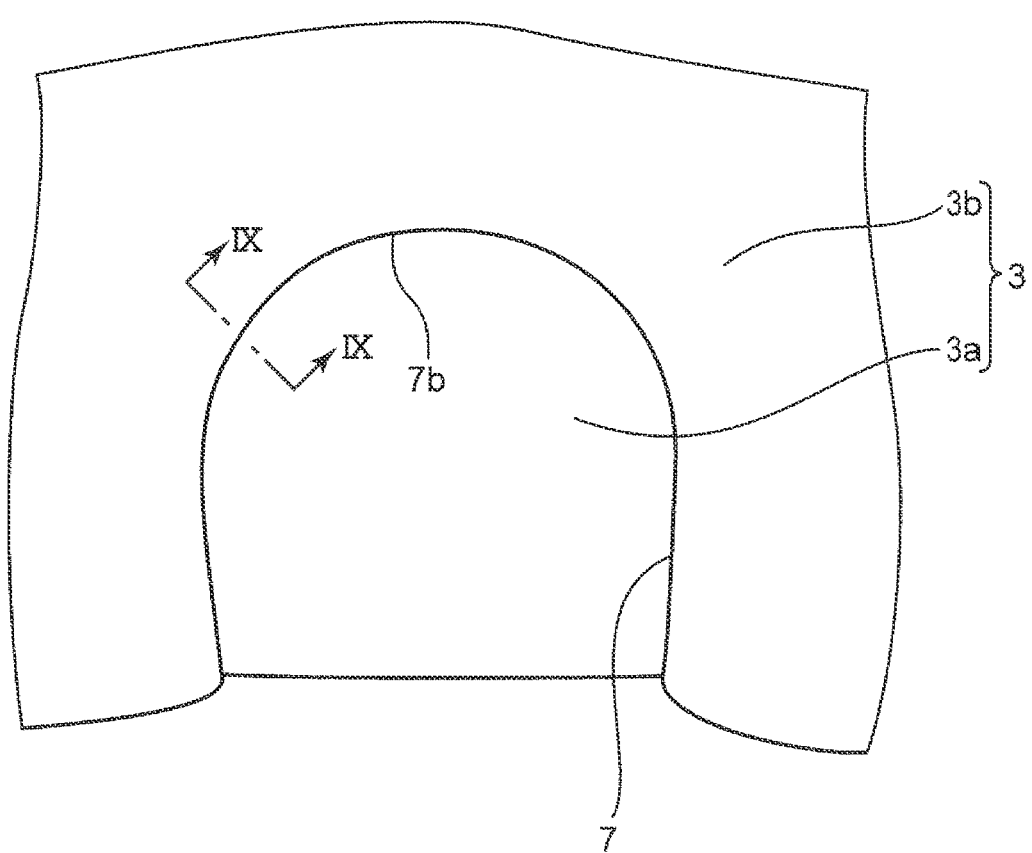
FIG. 8 is an explanatory view showing a simple sample of a state in which the inward-suspending member is sewn to the curved part of the inward-suspending portion by the sewing step of the manufacturing method for the seat of the present invention.

In this configuration, therefore, in the curved part of the inward-suspending portion 7, the main body 11 of the inward-suspending member 6 is sewn continuously to the inward-suspending portion 7, from the linear part to the curved part in the state where the rigid part 12 which is a high flexural rigidity part of the inward-suspending member 6 is bent and is kept extending in parallel with the end edge 7a at the position spaced outwards from the end edge 7a of the inward-suspending portion 7 extending in the longitudinal direction. As a result, at the curved part of the inward-suspending portion 7, the rigid part 12 develops a restitute force. Because of this restitutive force of the rigid part 12, the rigid part 12 pushes up the cover 3 in the direction of moving the cover 3 away from the pad 2, through the second edge 11a on the upper side of the main body 11 of the inward-suspending portion 7 (see a force F that pushes up the cover 3 in FIG. 9) while maintaining a state in which the length of the rigid part 12 matches the end edge 7a of the inward-suspending portion 7 in peripheral length. As a result, as shown in FIG. 8, the cover 3 is formed into an outward bulging solid shape at the curved part of the inward-suspending portion 7. This can prevent wrinkling of the cover 3.

In addition, according to the above configuration, it is only necessary to sew one inward-suspending member 6 continuously to the inward-suspending portion 7 of the cover 3, from the linear part to the curved part. It is therefore unnecessary to provide a separate part, which is different from the inward-suspending member 6, for only the curved part of the inward-suspending portion 7, as in conventional cases. It is thus possible to improve the attaching workability of the inward-suspending member 6 while keeping manufacturing cost low.

(2) More specifically, according to the seat 1 of the present embodiment, in the configuration in which the rigid part 12 is attached to the first edge 11b extending in the longitudinal direction on the lower side of the main body 11 (see FIGS. 9 and 10), the inward-suspending member 6 has the main body 11 continuously sewn to the inward-suspending portion 7 of the cover 3, from the linear part (range A in FIG. 1) to the curved part (range B in FIG. 1) of the inward-suspending portion 7. This causes the inward-suspending portion 7 of the cover 3 to rise relative to the main body of the cover 3 (specifically, relative to the cover part 3b located outside the curved part), then the second edge 11a on the upper side of the main body 11 of the inward-suspending member 6 to lift the cover 3 from its back, thus giving the cover 3 an outward bulging solid shape as its final shape. As a result, wrinkle formation on the cover 3 is suppressed to improve the appearance of the seat.

In addition, as the rigid part 12 is attached to the first edge 11b on the lower side of the main body 11 of the inward-suspending member 6, it is possible to accurately position the inward-suspending portion 6 relative to the inward-suspending portion 7 by spacing the rigid part 12 outward from the end edge 7a of the inward-suspending portion 7 such that the rigid part 12 extends in parallel with the end edge 7a of the inward-suspending portion 7 of the cover 3.

(3) Further, the main body 11 of the inward-suspending member 6 is superposed on the inward-suspending portion 7 of the cover 3 in a state where the rigid part 12 extends along and in parallel with the end edge 7a at the position spaced outwards from the end edge 7a extending in the longitudinal direction of the inward-suspending portion 7 and a part of the second edge 11a on the upper side of the main body 11 is overlapped to the cover 3 (i.e., the edge opposite to the first edge 11b on the lower side to which the rigid part 12 is attached). In this configuration, the inward-suspending member 6 is not folded back, and therefore manufacturing tolerance and dimensional variation are small.

For example, as shown in FIG. 10, the main body 11 of the inward-suspending member 6 is sewn continuously to the inward-suspending portion 7, from the linear part to the curved part in the positional relationship where the rigid part 12 extends in parallel with the end edge 7a of the inward-suspending portion 7 at a position spaced outwards from the end edge 7a extending in the longitudinal direction of the inward-suspending portion 7 and a part of the second edge 11a on the upper side of the main body 11 is overlapped to the cover 3. A distance D2, which is a reference distance for manufacturing tolerance adjustment (that is, a distance from the sewing portion 8 of the cover parts 3a, 3b of the cover 3 to the lower end (far side end) 12a of the rigid part 12), therefore, depends on a tolerance of the distance D1. Given a fact that the distance D1 is under strict control in the sewing step, a manufacturing tolerance of the reference distance D2 can be reduced.

As described above, according to the seat 1 of the present embodiment, one inward-suspending member 6 can be sewn continuously to the inward-suspending portion 7 of the cover 3 without carrying out a conventional process (e.g., attaching a separate part to only the curved part) for attaching the inward-suspending member 6 to the curved part of the inward-suspending portion 7. The workability of sewing work is therefore improved.

In addition, as the rigid part 12 of the inward-suspending member 6 faces the direction of fixing the inward-suspending portion 7 of the cover 3 (downward direction in FIGS. 9 and 10), trouble of folding back the main body 11 of the inward-suspending member 6 can be saved, thus improving assembling workability.

(4) According to the seat 1 of the present embodiment, as shown in FIGS. 2A and 2B, the inward-suspending portion 7 is formed by sewing together the two adjacent cover parts 3a and 3b making up the cover 3. The sewing portion 9, where the main body 11 of the inward-suspending member 6 is sewn to the inward-suspending portion 7, is located at the position closer to the end edge 7a of the inward-suspending portion 7, the end edge 7a extending in the longitudinal direction (see FIGS. 2B and 10), than the sewing portion 8 where the two cover parts 3a and 3b are sewn together on the inward-suspending portion 7.

In this configuration, although two sewing portions 8 and 9 are present on the inward-suspending portion 7 of the cover 3, their positions are different from each other, which raises less concern about damaging the appearance of the seat 1. In other words, the sewing portions 8 and 9 being on the same line may damage the appearance of the seat 1. For example, when the cover 3 is made of leather, a number of needle holes may be pierced on the same line on the inward-suspending portion 7 by the sewing work; while the cover 3 is made of cloth, such as woven fabric, a needle that penetrates the inward-suspending portion 7 on the same line by the sewing work may cut the weaving yarn and the cut weaving yarn may stick out of the surface of the seat 1. The possibility of damaging the appearance of the seat 1 in these cases is assumed to be high (specifically, about two times as high as the possibility in the case of the above configuration shown in FIGS. 2A and 2B). In the configuration shown in FIGS. 2A and 2B, the possibility of damaging the appearance of the seat 1 is reduced.

(5) According to the seat 1 of the present embodiment, as shown in FIGS. 9 and 10, the second edge 11a on the upper side of the main body 11 of the inward-suspending member 6 is in contact with the surface of cover 3 that is opposite to the pad 2. This allows the main body 11 of the inward-suspending member 6 to exert an effect of pushing the cover 3 outward, and therefore reliably prevents wrinkling of the cover 3 at the curved part of the inward-suspending portion 7.

FIGS. 9 and 10 show a state in which the second edge 11a is in contact with the cover part 3b with the sewing portion 8 interposed therebetween. The second edge 11a, however, may be in direct contact with the cover part 3b.

(6) A manufacturing method for the seat 1 according to the present embodiment is a method for manufacturing the seat 1 having the above configuration. The manufacturing method includes: a sewing step of sewing the main body 11 continuously to the inward-suspending portion 7, from the linear part to the curved part while maintaining a state where the rigid part 12 of the inward-suspending member 6 is spaced by a predetermined distance outwards from the end edge 7a extending in the longitudinal direction of the inward-suspending portion 7 and a part of the second edge 11a on the upper side of the main body 11 is overlapped to the cover; and a cover attaching step of fixing the inward-suspending portion 7 to the pad 2 in a state where the main body 11 of the inward-suspending member 6 extends along the inward-suspending portion 7 without being folded back, thereby attaching the cover 3 to the pad 2.

According to this manufacturing method, the main body 11 of the inward-suspending member 6 can be sewn continuously to the inward-suspending portion 7, from the linear part to the curved part while keeping the rigid part 12 in parallel with the end edge 7a of the inward-suspending portion 7, by maintaining a state where the rigid part 12 of the inward-suspending member 6 is spaced by a predetermined distance outwards from the end edge 7a extending in the longitudinal direction of the inward-suspending portion 7 while overlapping a part of the second edge 11a on the upper side of the main body 11 of the inward-suspending member 6. Thus, the main body 11 of the inward-suspending member 6 can be sewn continuously to the inward-suspending portion 7, from the linear part to the curved part while deforming the rigid part 12 in conformity to the curved part of the inward-suspending portion 7. Thus, it becomes possible to carry out sewing one inward-suspending member 6 to the inward-suspending portion 7 of the cover 3, continuously from the linear part to the curved part in a reliable manner. Hence the above-mentioned wrinkle formation can be suppressed and at the same time, the attaching workability of the inward-suspending member 6 can be improved as manufacturing cost is kept low.

(7) More specifically, according to the manufacturing method for the seat according to the present embodiment, as the sewing step is carried out while maintaining the state where the rigid part 12 of the inward-suspending member 6 is spaced by a predetermined distance outwards from the end edge 7a extending in the longitudinal direction of the inward-suspending portion 7 and a part of the second edge 11a on the upper side of the main body 11 is overlapped to the cover 3, work of folding back the inward-suspending member 6 is unnecessary, which makes manufacturing tolerance and dimensional variation small. This allows one inward-suspending member 6 to be sewn continuously to the inward-suspending portion 7 of the cover 3 without carrying out a conventional process for attaching the inward-suspending member 6 to the curved part of the inward-suspending portion 7. The workability of sewing work is therefore improved. In addition, the rigid part 12 of the inward-suspending member 6 is positioned so as to face the direction of fixing the inward-suspending portion 7 of the cover 3 (downward direction in FIGS. 9 and 10). This saves trouble of folding back the main body 11 of the inward-suspending member 6, thus improving assembling workability.

In the above sewing step, as a result of sewing the main body 11 continuously to the inward-suspending portion 7, from the linear part to the curved part while maintaining the state where the rigid part 12 of the inward-suspending member 6 is spaced by a predetermined distance outwards from the end edge 7a extending in the longitudinal direction of the inward-suspending portion 7 and a part of the second edge 11a on the upper side of the main body 11 is overlapped to the cover the rigid part 12 develops a restitutive force at the curved part of the inward-suspending portion 7, and because of this restitutive force, the rigid part 12 pushes up the cover 3 in the direction of moving the cover 3 away from the pad 2, through the second edge 11a on the upper side of the main body 11 of the inward-suspending portion 7 (see a force F that pushes up the cover 3 in FIG. 9) while maintaining a state in which the length of the rigid part 12 matches the end edge 7a of the inward-suspending portion 7 in peripheral length. As a result, as shown in FIG. 8, the cover 3 is formed into an outward bulging solid shape at the curved part 7b of the inward-suspending portion 7. This can prevent wrinkling of the cover 3. In addition, the rigid part 12, which is attached to the first edge 11b of the main body 11 of the inward-suspending member 6, the first edge 11b extending in the longitudinal direction, is located outside the inward-suspending portion 7 and is separated away from the end edge 7a of the inward-suspending portion 7 of the cover 3 by the given distance. This allows the inward-suspending member 6 to be positioned accurately relative to the inward-suspending portion 7.

According to the manufacturing method, the main body 11 of the inward-suspending member 6 is positioned such that the main body 11 with a given width is sewn to the inward-suspending portion 7, regardless of the width of the inward-suspending portion 7 of the cover 3. It is therefore unnecessary to change the width of the main body 11 of the inward-suspending member 6 in accordance with the width of the inward-suspending portion 7 of the cover 3. This allows providing the main body 11 with a specified width to make the inward-suspending member 6 a commonly used member. Hence manufacturing cost can be reduced.

The inward-suspending member 6 of the present embodiment, compared with a conventional inward-suspending member (e.g., an inward-suspending member 36 whose main body 41 is folded back when used, as shown in FIGS. 11 to 15), can be further reduced in the width of the main body 11. This feature also contributes to reduction in manufacturing cost.

(8) According to the manufacturing method for the seat 1 according to the present embodiment, the inward-suspending member 6 to be used is the one having the main body 11 of the shape extending linearly with a given width. Processing the inward-suspending member 6 in advance into a shape conforming to the curved part of the inward-suspending portion 7 before sewing the inward-suspending member 6 to the inward-suspending portion 7 is, therefore, unnecessary, and thus manufacturing cost can be kept low.

(9) According to the manufacturing method for the seat 1 according to the present embodiment, the sewing step is carried out such that the main body 11 of the inward-suspending member 6 is sewn to the inward-suspending portion 7 while maintaining a state where the rigid part 12 is spaced by a predetermined distance outwards from the end edge 7a extending in the longitudinal direction of the inward-suspending portion 7 using the sewing jig.

According to this feature, in the sewing step, as the rigid part 12 of the inward-suspending member 6 is spaced by a predetermined distance outwards from the end edge 7a of the inward-suspending portion 7 using the sewing jig, work of providing a mark for positioning the inward-suspending member 6 on either the inward-suspending member 6 or the inward-suspending portion 7 becomes unnecessary, which allows reduction of manufacturing cost.

(Description of Comparison with Comparative Example)

A comparative example to be compared with the configuration of the seat 1 of the present embodiment will hereinafter be described. The structure of a conventional seat will be described with reference to FIGS. 11 to 15 through comparison between the present embodiment and the comparative example.

The structure of the conventional seat, which is shown in comparative example of FIGS. 11 to 15, includes a pad 32 having a groove 35, a cover 33 having an inward-suspending portion 37, and an inward-suspending member 36, and the inward-suspending member 36 has a main body 41 and a rigid part 42. This structure is similar to the structure of the seat 1 shown in FIGS. 2A and 2B, because both structures include constituent elements and configurations thereof that are similar to each other.

The structure shown in the comparative example of FIGS. 11A to 15, however, is different from the structure according to the present embodiment in the following points (i) to (iii).

(i) In the comparative example of FIGS. 11 to 15, alignment is made such that an edge 41a (an edge opposite to the rigid part 42) of the main body 41 of the inward-suspending member 36, the edge 41a extending in the longitudinal direction, matches an end edge 37a of the inward-suspending portion 37. In the present embodiment, in contrast, alignment is made such that the end edge 7a (FIGS. 4 and 10) of the inward-suspending portion 7 and the rigid part 12 in a manner where the rigid part 12 is spaced by a predetermined distance D1 outwards from the end edge 7a extending of the inward-suspending portion 7.

(ii) In the comparative example of FIGS. 11 to 15, the position of a sewing portion 39, where the main body 41 of the inward-suspending member 36 is sewn to the inward-suspending portion 37, matches the position of a sewing portion 38, where cover parts 33a and 33b of the cover 33 are sewn together. In the present embodiment, in contrast, the position of the sewing portion 9 (FIGS. 2A, 2B and 9 to 10), where the main body 11 of the inward-suspending member 6 is sewn to the inward-suspending portion 7, is shifted to the side (lower side) that is closer to the end edge 7a of the inward-suspending portion 7 than the sewing portion 8 for sewing the cover parts 3a and 3b of the cover 3 together.

(iii) In the comparative example of FIGS. 11 to 15, the main body 41 of the inward-suspending member 36 is sewn to the inward-suspending portion 37 and then is folded back at the position of the sewing portion 39, in which state the rigid part 42 is fixed inside the groove 35 of the pad 32. In the present embodiment, in contrast, as shown in FIGS. 2A and 2B, the main body 11 of the inward-suspending member 6 is not folded back after being sewn to the inward-suspending portion 7, so that the rigid part 12 is fixed inside the groove 5 of the pad 2 as the main body 11 extends parallel with the inward-suspending portion 7.

Based on the above points of difference (i) to (iii), according to the present embodiment, the rigid part 12 of the inward-suspending member 6, the rigid part 12 having high flexural rigidity, is bent at the curved part of the inward-suspending portion 7 and yet maintains the state in which the rigid part 12 at the position outside the inward-suspending portion 7 and separated away from the end edge 7a of the inward-suspending portion 7, the end edge 7a extending in the longitudinal direction, extends parallel with the end edge 7a, as described above in (1) of "(Features of Present Embodiment)", while the main body 11 of the inward-suspending member 6 is sewn continuously to the inward-suspending portion 7, from the linear part to the curved part. As a result, the rigid part 12 develops a restitutive force at the curved part of the inward-suspending portion 7. Because of this restitutive force of the rigid part 12, the rigid part 12 pushes up the cover 3 in the direction of moving the cover 3 away from the pad 2, via the second edge 11a of the main body 11 of the inward-suspending member 6 (see the force F that pushes up the cover 3 in FIG. 9) while maintaining the state in which the rigid part 12 matches the end edge 7a of the inward-suspending portion 7 in peripheral length. As a result, as shown in FIG. 8, the cover 3 is formed into an outward bulging solid shape at the curved part 7b of the inward-suspending portion 7. This can prevent wrinkling of the cover 3.

Figure 13:
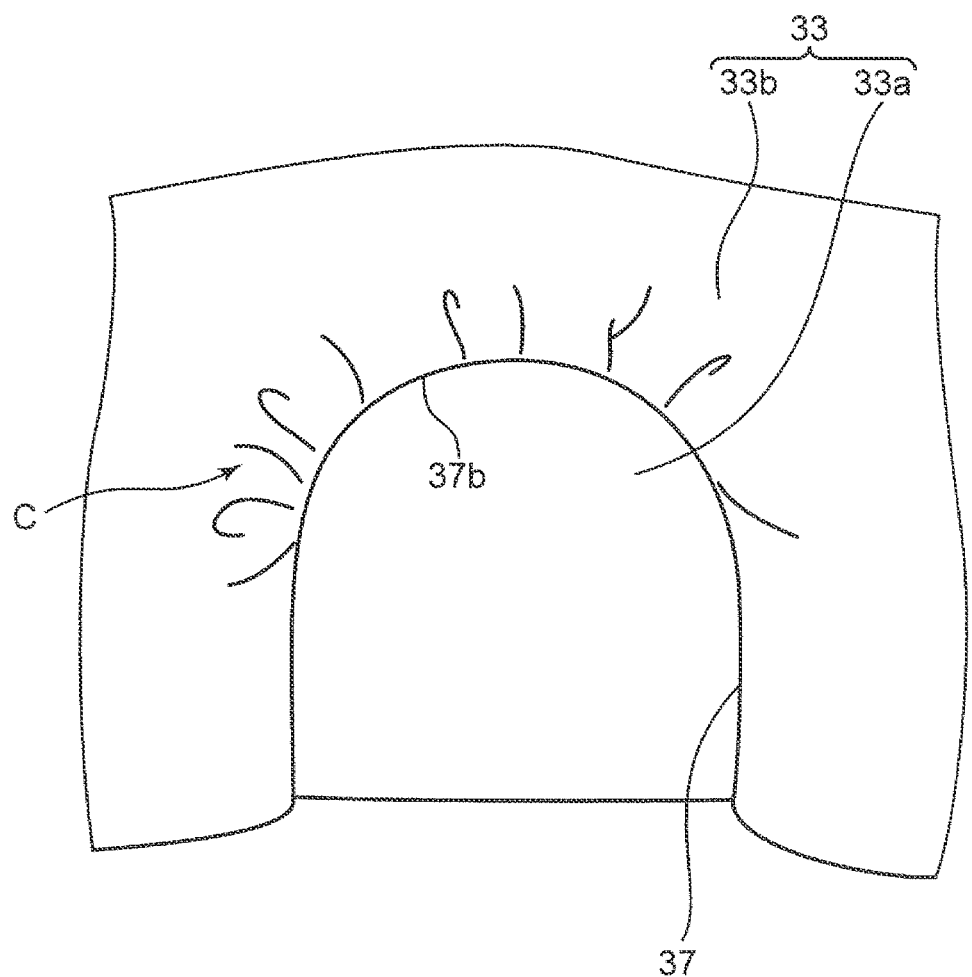
FIG. 13 shows a comparative example such that wrinkles appear on a curved part as a result of the inward-suspending member being sewn to the curved part of the inward-suspending portion of the conventional seat.
Figure 14:
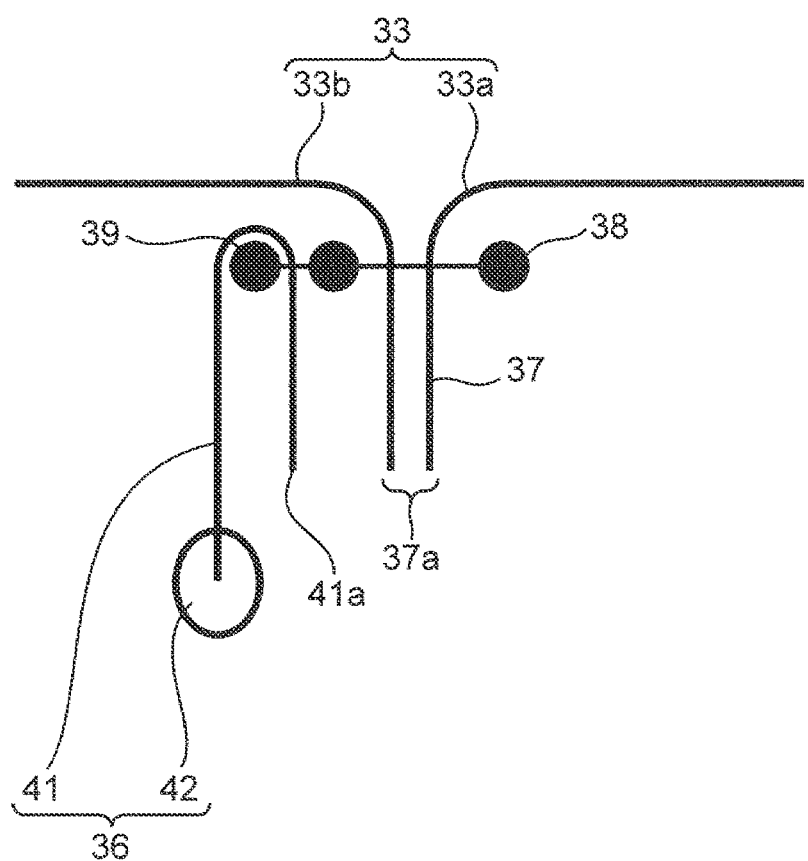
FIG. 14 is a cross-sectional view of the inward-suspending portion and the inward-suspending member of FIG. 13.
Figure 15:
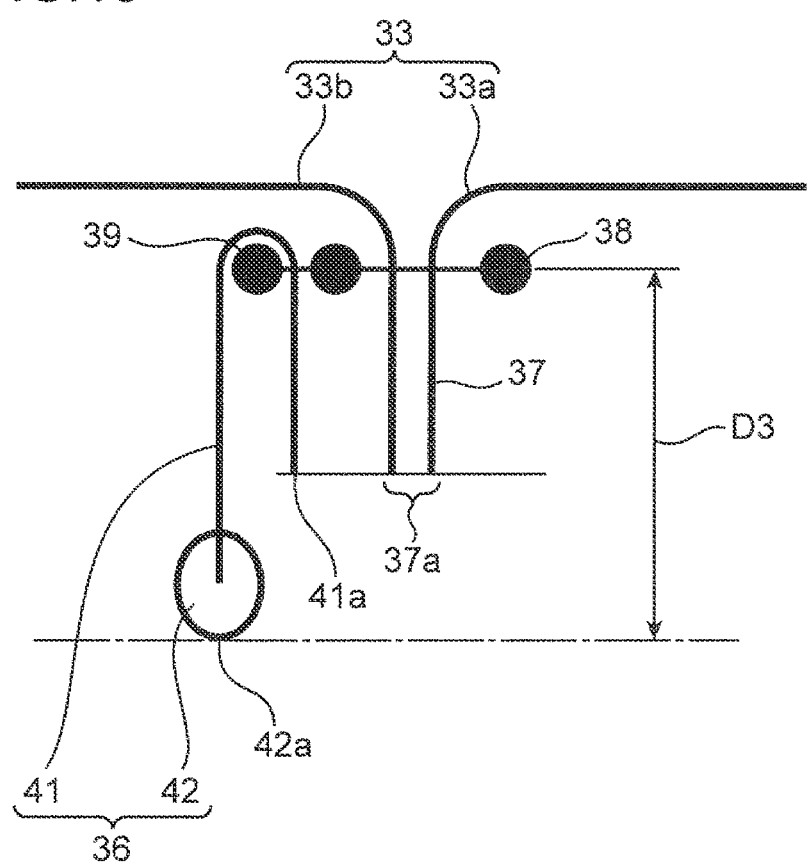
FIG. 15 shows a dimensional relationship in the cross-sectional view of FIG. 14.

In the comparative example of FIGS. 11 to 15, in contrast, at the curved part of the inward-suspending portion 37, the inward-suspending portion 37 and the edge 41a (the edge opposite to the rigid part 42) of the main body 41 of the inward-suspending member 36 match in peripheral length but the inward-suspending portion 37 and the rigid part 42 do not match in peripheral length. For this reason, the force that pushes up the cover 33 in the direction of moving the cover 33 away from the pad 32 is not generated, and consequently, on the cover 33, wrinkles C appear on a curved part 37b of the inward-suspending portion 37, as shown in FIG. 13. In this case, wrinkling of the cover 33 cannot be prevented in contrast with the present embodiment in which wrinkling of the cover 3 is prevented.

According to the configuration of the present embodiment, it is only necessary to sew one inward-suspending member 6 continuously to the inward-suspending portion 7 of the cover 3, from the linear part to the curved part. It is therefore unnecessary to provide a separate part, which is different from the inward-suspending member 6, for only the curved part of the inward-suspending portion 7, as in conventional cases. It is thus possible to improve the attaching workability of the inward-suspending member 6 while keeping manufacturing cost low. In the comparative example of FIGS. 11 to 15, however, it is necessary to provide a separate part for the curved part 37b of the inward-suspending portion 37 in order to prevent wrinkling. This makes it impossible to keep manufacturing cost low and to improve the attaching workability of the inward-suspending member 36.

According to the present embodiment, as described above in (3) of "(Features of Present Embodiment)", the main body 11 of the inward-suspending member 6 is superposed on the inward-suspending portion 7 of the cover 3 in the state where the rigid part 12 extends in parallel with the end edge 7a at the position spaced outwards from the end edge 7a extending in the longitudinal direction of the inward-suspending portion 7 and a part of the second edge 11a (i.e., the edge opposite to the first edge 11b to which the rigid part 12 is attached) on the upper side of the main body 11 is overlapped to the cover 3. This is not a structure in which the inward-suspending member 6 is folded back, and therefore leads to smaller manufacturing tolerance and dimensional variation. The structure shown in the comparative example of FIGS. 11 to 15, however, is a structure in which the inward-suspending member 36 is folded back, and therefore leads to larger manufacturing tolerance and dimensional variation. For example, a distance D3 shown in the comparative example of FIG. 15, the distance D3 being a reference distance for manufacturing tolerance adjustment (that is, a distance from the sewing portion 38, where the cover parts 33a and 33b of the cover 33 are sewn together, to a lower end (far side end) 42a of the rigid part 42), depends on the total length of the main body 41 that is folded back. Reducing a manufacturing tolerance of the distance D3 is therefore difficult, which leads to larger manufacturing tolerance and dimensional variation.

According to the present embodiment, as described above in (4) of (Features of Present Embodiment), although two sewing portions 8 and 9 are present in the inward-suspending portion 7 of the cover 3, their positions are different from each other, which raises less concern about damaging the appearance of the seat 1. In the comparative example of FIGS. 11 to 12, in contrast, two sewing portions 38 and 39 match in position on the inward-suspending portion 37 of the cover 33. When the cover 3 is made of cloth or the like, therefore, there is a concern that the weaving yarn may be broken to damage the appearance of the seat.

According to the present embodiment, as described above in (7) of "(Features of Present Embodiment)", work of folding back the inward-suspending member 6 is unnecessary, which allows accurate positioning of the inward-suspending member 6. This makes manufacturing tolerance and dimensional variation small, and allows one inward-suspending member 6 to be sewn continuously to the inward-suspending portion 7 of the cover 3, thus improving the sewing workability. In addition, the rigid part 12 of the inward-suspending member 6 is positioned so as to face the direction in which the inward-suspending portion 7 of the cover 3 is pulled in (downward direction in FIGS. 9 and 10). This saves trouble of folding back the main body 11 of the inward-suspending member 6, thus improving assembling workability. In the comparative example of FIGS. 11 to 15, in contrast, work of folding back the inward-suspending member 36 is necessary, which takes time and effort, and accurate positioning of the inward-suspending member 36 cannot be performed. Manufacturing tolerances and dimensional variation thus increase. In addition, one inward-suspending member 36 cannot be sewn continuously to the inward-suspending portion 37 of the cover 33 and a separate part is required for the curved part of the inward-suspending portion 37. Improving the workability of sewing work is, therefore, difficult.

According to the manufacturing method of the present embodiment, the main body 11 of the inward-suspending member 6 is positioned such that the main body 11 with a given width is sewn to the inward-suspending portion 7, regardless of the width of the inward-suspending portion 7 of the cover 3. It is therefore unnecessary to change the width of the main body 11 of the inward-suspending member 6 in accordance with the width of the inward-suspending portion 7 of the cover 3. This allows providing the main body 11 with a specified width to make the inward-suspending member 6 a commonly used member. Hence manufacturing cost can be reduced. In the comparative example of FIGS. 11 to 15, in contrast, the inward-suspending member 36 having the main body 41 with the width corresponding to the width of the inward-suspending portion 37 of the cover 33 is required. Therefore, it is impossible to commonly use the inward-suspending member 36 for other applications, which makes reduction of manufacturing cost difficult.

<Summary of Embodiment>

The above embodiment is summarized as follows.

A seat of the present embodiment includes: a pad; a cover that covers a surface of the pad, the cover having an inward-suspending portion projecting in a direction of approaching the pad from a side opposite to the pad; and an inward-suspending member that fixes the inward-suspending portion to the pad. The inward-suspending portion includes a linear part and a curved part continuous with each other. The inward-suspending member includes a main body of a strip shape, the main body having a first edge and a second edge that extend in a longitudinal direction, and a rigid part of a linear shape, the rigid part having flexural rigidity higher than that of the main body and attached to the first edge of the main body. The main body of the inward-suspending member is superposed on the inward-suspending portion of the cover in a state where the rigid part extends in parallel with the end edge at the position spaced outwards from the end edge extending in the longitudinal direction of the inward-suspending portion and a part of the second edge on the upper side of the main body is overlapped to the cover. The main body is sewn continuously to the inward-suspending portion, from the linear part to the curved part. The inward-suspending portion is fixed to the pad in a state in which the main body of the inward-suspending member extends along the inward-suspending portion without being folded back.

In this configuration, the main body of the inward-suspending member is superposed on the inward-suspending portion of the cover in the state in which the rigid part at the position outside the inward-suspending portion and separated away from the end edge of the inward-suspending portion, the end edge extending in the longitudinal direction, extends along and parallel with the end edge as the second edge of the main body overlaps the cover. In addition, the main body is sewn continuously to the inward-suspending portion, from the linear part to the curved part. The inward-suspending portion is fixed to the pad in the state in which the main body of the inward-suspending member extends along the inward-suspending portion without being folded back.

In this configuration, therefore, the main body of the inward-suspending member is sewn continuously to the inward-suspending portion, from the linear part to the curved part while maintaining a state where, at a curved portion of the inward-suspending portion, the rigid part which is a high flexural rigidity part of the inward-suspending member is bent and is kept extending in parallel with the end edge at the position spaced outwards from the end edge of the inward-suspending portion extending in the longitudinal direction. As a result, at the curved part of the inward-suspending portion, the rigid part develops a restitutive force. Because of this restitutive force of the rigid part, the rigid part pushes up the cover in the direction of moving the cover away from the pad, via the second edge of the main body of the inward-suspending member while maintaining the state in which the rigid part matches the end edge of the inward-suspending portion in peripheral length. As a result, the cover is formed into an outward bulging solid shape at the curved part of the inward-suspending portion. This can prevent wrinkling of the cover.

In addition, according to the above configuration, it is only necessary to sew one inward-suspending member continuously to the inward-suspending portion of the cover, from the linear part to the curved part. It is therefore unnecessary to provide a separate part, which is different from the inward-suspending member, for only the curved part of the inward-suspending portion, as in conventional cases. It is thus possible to improve the attaching workability of the inward-suspending member while keeping manufacturing cost low.

In the above seat, it is preferable that the inward-suspending portion be formed by sewing together two cover parts adjacent to each other, the two cover parts making up the cover, and a portion where the main body is sewn to the inward-suspending portion be at a position closer to the end edge of the inward-suspending portion, the end edge extending in a longitudinal direction, than a portion where the two cover parts are sewn together on the inward-suspending portion.

In this configuration, although two sewing portions exist on the inward-suspending portion of the cover, their positions are different from each other, which raises less concern about damaging the appearance of the seat.

In the above seat, it is preferable that the second edge of the main body of the inward-suspending member be in contact with a surface of the cover that is opposite to the pad.

In this configuration, the main body of the inward-suspending member can reliably exert an effect of pushing the cover outward, and therefore reliably prevents wrinkling of the cover at the curved part of the inward-suspending portion.

A manufacturing method for a seat according to the present embodiment is a manufacturing method for a seat including: a pad; a cover that covers a surface of the pad, the cover having an inward-suspending portion projecting in a direction of approaching the pad from a side opposite to the pad; and an inward-suspending member that fixes the inward-suspending portion to the pad, the inward-suspending portion including a linear part and a curved part continuous with each other, and the inward-suspending member including a main body of a strip shape, the main body having a first edge and a second edge that extend in a longitudinal direction, and a rigid part of a linear shape, the rigid part having flexural rigidity higher than that of the main body and attached to the first edge of the main body. The manufacturing method includes: a sewing step of sewing the main body continuously to the inward-suspending portion, from the linear part to the curved part while maintaining a state where the rigid part of the inward-suspending member is spaced by a predetermined distance outwards from the end edge extending in the longitudinal direction of the inward-suspending portion and a part of the second edge on the upper side of the main body is overlapped to the cover; and a cover attaching step of fixing the inward-suspending portion to the pad as the main body of the inward-suspending member extends along the inward-suspending portion without being folded back, thereby attaching the cover to the pad.

According to this manufacturing method, as the rigid part of the inward-suspending member is spaced by a predetermined distance outwards from the end edge extending in the longitudinal direction of the inward-suspending portion and a part of the second edge on the upper side of the main body is overlapped to the cover, it is possible to continuously sew the main body of the inward-suspending member to the inward-suspending portion while keeping the rigid part in parallel with the end edge extending in the longitudinal direction of the inward-suspending member Thus, the main body of the inward-suspending member can be sewn continuously to the inward-suspending portion, from the linear part to the curved part while deforming the rigid part in conformity to the curved part of the inward-suspending portion. Thus, work of sewing one inward-suspending member to the inward-suspending portion of the cover, continuously from the linear part to the curved part can be carried out in a reliable manner. Hence the attaching workability of the inward-suspending member can be improved while the manufacturing cost of the seat with less formation of the above-mentioned wrinkles is kept low.

According to the above manufacturing method for the seat, it is preferable to use an inward-suspending member with the main body having a shape extending linearly with a given width.

Such a feature eliminates the need of processing the inward-suspending member in advance into a shape conforming to the curved part of the inward-suspending portion before sewing the inward-suspending member to the inward-suspending portion, and thus manufacturing cost can be kept low.

According to the above manufacturing method for the seat, it is preferable that in the sewing step, the main body of the inward-suspending member be sewn to the inward-suspending portion as the rigid part is held such that the rigid part outside the inward-suspending portion is kept in a state of being separated from an end edge of the inward-suspending portion, the end edge extending in a longitudinal direction, by a given distance, using a sewing jig.

According to this feature, in the sewing step, the rigid part 12 of the inward-suspending member 6 is spaced by a predetermined distance outwards from the end edge 7a extending in the longitudinal direction of the inward-suspending portion 7 using the sewing jig. Because of this sewing step, work of providing a mark for positioning the inward-suspending member on either the inward-suspending member or the inward-suspending portion becomes unnecessary, which allows reduction of manufacturing cost.

According to the seat and the manufacturing method thereof according to the present embodiment, wrinkling of the cover at the curved part of the inward-suspending portion can be prevented, and at the same time, the workability of the inward-suspending member attachment work can be improved as manufacturing cost is kept low.

The invention claimed is:

1. A seat comprising:
   a pad;
   a cover that covers a surface of the pad, the cover having an inward-suspending portion projecting in a direction approaching the pad from a side opposite to the pad; and
   an inward-suspending member that fixes the inward-suspending portion to the pad,
   wherein the inward-suspending portion includes a linear part and a curved part continuous with each other,
   the inward-suspending member includes a main body of a strip shape, the main body having a first edge and a second edge that extend in a longitudinal direction, and a rigid part of a linear shape, the rigid part having flexural rigidity higher than that of the main body and attached to the first edge of the main body,
   the main body of the inward-suspending member is superposed on the inward-suspending portion of the cover in a state where the rigid part extends in parallel with an end edge at a position spaced outwards from the end edge extending in a longitudinal direction of the inward-suspending portion and a part of the second edge on the upper side of the main body overlaps the cover,
   the main body is sewn continuously to the inward-suspending portion, from the linear part to the curved part, and
   the inward-suspending portion is fixed to the pad in a state in which the main body of the inward-suspending member extends along the inward-suspending portion without being folded back,
   the inward-suspending portion is formed by sewing together two cover parts adjacent to each other, the two cover parts making up the cover,
   a portion where the main body is sewn to the inward-suspending portion is at a position closer to an end edge of the inward-suspending portion, the end edge extending in a longitudinal direction, than a portion where the two cover parts are sewn together on the inward-suspending portion, and
   the second edge of the main body of the inward-suspending member is located above the portion where the two cover parts are sewn together on the inward-suspending portion and is in contact with the cover part located outside the curved part as a surface of the cover that is opposite to the pad.

* * * * *